United States Patent
Olofsson et al.

(10) Patent No.: US 6,647,265 B1
(45) Date of Patent: Nov. 11, 2003

(54) ADMISSION CONTROL OF MULTIPLE ADAPTIVE AND ELASTIC APPLICATIONS

(75) Inventors: Håkan Olofsson, Stockholm (SE); Magnus Almgren, Sollentuna (SE); Christer Johansson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/522,905

(22) Filed: Mar. 10, 2000

Related U.S. Application Data (63) Continuation-in-part of application No. 09/225,223, filed on Jan. 4, 1999.
(60) Provisional application No. 60/134,539, filed on May 17, 1999.

(51) Int. Cl.[7] ................................................ H04Q 7/20
(52) U.S. Cl. ........................................ 455/445; 455/433
(58) Field of Search ................................ 455/432, 433, 455/435, 458, 445; 370/230, 230.1

(56) References Cited

U.S. PATENT DOCUMENTS

| | | | | |
|---|---|---|---|---|
| 5,157,709 A | * | 10/1992 | Ohteru .......................... | 455/465 |
| 6,097,965 A | * | 8/2000 | Honkasalo et al. .......... | 455/550 |
| 6,148,197 A | * | 11/2000 | Bridges et al. .............. | 455/432 |
| 6,421,714 B1 | * | 7/2002 | Rai et al. ..................... | 709/217 |
| 6,466,802 B1 | * | 10/2002 | Blakeney et al. ............ | 455/552 |
| 6,469,991 B1 | * | 10/2002 | Chuah ......................... | 370/329 |

* cited by examiner

*Primary Examiner*—Nay Maung
*Assistant Examiner*—Tu Nguyen (57) ABSTRACT

A control system for handling a range of data transfer rates within a telecommunication network is disclosed. The system comprises an application interpreter for generating at least one bearer request; an admission control apparatus for matching said at least one bearer request with at least one offered bearer to produce a negotiated bearer; and a radio resource manager for receiving the negotiated bearer and maintaining a level of quality specified in said bearer request.

15 Claims, 4 Drawing Sheets

ADMISSION CONTROL OF MULTIPLE ADAPTIVE AND ELASTIC APPLICATIONS

RELATED APPLICATIONS

This application claims the benefit of U.S. provisional Application No. 60/134,539 filed May. 17, 1999 and is a continuation-in-part of application Ser. No. 09/225,223 filed Jan. 4, 1999.

FIELD OF INVENTION

This invention relates to cellular telecommunications networks and more particularly to generating a desired quality-of-service (QoS) for communication between a communication unit and a service provider (i.e., a bearer such as a radio network) at call set-up or at handoff.

BACKGROUND

In a typical cellular communication network, a user defines his or her service requirements to a bearer (i.e., a service provider) in terms of one or more requested quality-of-service (QoS) vectors or requested service vector, RSV. Each vector consists of a number of QoS parameters which relate to the required service. Alternatively, a user's requirements may be input into a computer or a computer application which performs the negotiation with the bearer. The QoS parameters may include, but are not limited to, required bit rate (peak, mean and/or some other rate), required bit error rate (BER) and required transmission delay. In addition, the user may also specify a price parameter for a desired service. For a given application, a range of values for each of these QoS parameters may be acceptable to the user. For example, in a web browsing application, a user normally desires a high bit rate for which the user is willing to pay a higher price. However, a user may tolerate a lower bit rate if the user is interested in minimizing the price. For some applications, the range of values for certain QoS parameters that the user is willing to accept may be relatively small. For example, in a voice application, the user may not be willing to tolerate a lower bit rate or a longer transmission delay because of the susceptibility of speech data to low bit rates and/or long delays. Under less than acceptable conditions, e.g., low bit rate and long delay, it may be preferable that the call be blocked.

One way the user can express its service requirements to the service provider is to define two QoS vectors, wherein the QoS parameter values in the first QoS vector represent a desired service, and wherein the QoS parameter values in the second QoS vector represent an acceptable (or minimum level of) service. Typically, the desired QoS parameter values indicate a lower price level sensitivity on behalf of the user, as suggested above. In contrast, the acceptable QoS parameter values are associated with a higher price level sensitivity. In the case of speech, the desired value and the acceptable value for certain QoS parameters (e.g., maximum transmission delay) may be the same, thus indicating a user's unwillingness to accept less than desired values for those QoS parameters. The at least two QoS vectors containing the desired and acceptable QoS parameter values may be expressed as:

$QoS_{desired} = (\text{bit rate}_{maximum}, \text{delay}_{minimum}, \ldots, \text{price}_{desired})$ $QoS_{minimum} = (\text{bit rate}_{minimum}, \text{delay}_{maximum}, \ldots, \text{price}_{acceptable})$ Alternatively, a user may define for the service provider a set of QoS vectors, $QoS_1 \ldots QoS_n$, wherein the combination of QoS parameter values in vector $QoS_1$ represent a desired service, wherein the combination of QoS parameter values in vector $QoS_n$ represent a minimum, but acceptable service, and wherein the combination of QoS parameter values in vectors $QoS_2$ to $QoS_{n-1}$ represent acceptable service that is less than the desired service but better than the minimum acceptable service. In the web browsing application, for example, each of the vectors $QoS_1$ to $QoS_N$ might contain a different bit rate value. For the speech application, however, each of QoS vectors $QoS_1$ to $QoS_n$ may contain the same bit rate value, once again, exemplifying that with speech data, a user is generally less likely to accept a QoS that is less than the desired QoS. The set of QoS vectors $QoS_1$ to $QoS_N$ may be expressed as:

$QoS_1 = (\text{bit rate}_1, \text{delay}_1, \ldots, \text{price}_1)$ $QoS_2 = (\text{bit rate}_2, \text{delay}_2, \ldots, \text{price}_2)$ $QoS_3 = (\text{bit rate}_3, \text{delay}_3, \ldots, \text{price}_3)$ $QoS_4 = (\text{bit rate}_4, \text{delay}_4, \ldots, \text{price}_4)$ $QoS_n = (\text{bit rate}_n, \text{delay}_n, \ldots, \text{price}_n)$ At call set-up, handover and call re-negotiation, a determination has to be made as to which service will be used to establish a connection. The requirements of the user and the capability of the bearer have to be taken into account. The capability of the bearer is also expressed in the form of a QoS vector and may be referred to as an offered service vector, OSV. The procedure that results in generation of an OSV is known as a bearer service generation. The procedure that attempts to match user requirements with bearer capabilities is known as a bearer service negotiation. The bearer service negotiation process results in the generation of a negotiated QoS vector or NSV. In general, a NSV contains QoS parameter values that reflect the service which the service provider is capable of providing and which satisfy requirements of the user specified values in a RSV. In the event that no match between the requirements of the user and the capability of the bearer is established, the NSV is said to be empty.

A service provider cannot always guarantee the quality of service defined by the NSV. In actuality, the QoS parameter values in the NSV merely represent the service which the service provider will attempt to achieve for the user at call set-up, handover or call re-negotiation. However, during the time period between the bearer service negotiation and, for example, call set-up, conditions may change due to such phenomena as data traffic fluctuation and fading, thereby making it impossible for the service provider to achieve the level of service defined by the NSV. If the service provider cannot, in fact, achieve at least the user's minimum acceptable service requirements, the bearer service has to be renegotiated, or in the case of an on-going call, handed over (i.e., to a different service provider) or dropped.

With data services being added to cellular networks, wireless systems engineering is faced with the task of having to accommodate connections belonging to different services each of which may have a different quality requirement. In a complex mixture of different applications using wireless access in $2^{nd}$ generation system (such GSM, TDMA/136, etc.,), WCDMA and wireless LANs, lack of structured service handling will result in a low system performance and create added difficulty to operators managing networks.

Full rate and half rate speech is currently available in commercial GSM systems and circuit switched data will soon extend to multiple slot transmission. Admission control (which controls access to a service) of these mixed services, though possible, is rudimentary since there are few service types. In addition, load of services other than full rate speech is low. Attempts to address mixed services wireless systems have focused on the task of allocating radio resources to a delay-critical service such as speech and a non-delay critical service such as data according to a predefined access protocol.

Several problems exist in current solutions for handling mixed services. These problems are treated on a service-by-service basis without an overall structure which leads to difficulties in a system supporting a complex mix of services.

For admission control, service differentiation and user differentiation are not covered extensively. That is, there may be resources available for one service but not for another and it may be available for one important user but not for another.

Adaptive applications, i.e., application with multiple operation modes, are not well covered either. A video codec, for example, can operate in multiple bit rate modes. These modes correspond to the bandwidth available, and hence bandwidth negotiation has to take place at least at connection setup.

Elastic applications, such as web browsing, which can operate in a single mode using a variety of bearers (and give the user a corresponding variety of quality) have also not been treated extensively.

What is desired, therefore, is a solution for handling mixed services which is adaptive in order to accommodate applications having multiple operating modes as well as for handling elastic applications.

SUMMARY OF THE INVENTION

According to exemplary embodiments, a telecommunication control system for handling a range of data transfer rates within a network is disclosed. The system comprises: an application interpreter for generating at least one bearer request; an admission control apparatus for matching the at least one bearer request with at least one offered bearer to produce a negotiated bearer; and a radio resource manager for receiving the negotiated bearer and maintaining a level of quality specified in said bearer request.

According to other exemplary embodiments, a method for performing an admission control function in a telecommunication system handling a range of data rates is disclosed. The method comprises the steps of: generating at least one offered bearer by a bearer generator in response to a request for a bearer; matching the requested bearer with the generated bearer; and providing a negotiated bearer wherein the negotiated bearer results from the matching of the requested bearer with the generated bearer.

BRIEF DESCRIPTION OF THE DRAWINGS

These and other objects, features and advantages of the present invention will be readily apparent to one skilled in the art from the following written description, read in conjunction with the drawings, in which.

DETAILED DESCRIPTION

In the following description, for purposes of explanation and not limitation, specific details are set forth, such as particular techniques and methods, etc. in order to provide a thorough understanding of the present invention. However, it will be apparent to one skilled in the art that the present invention may be practiced in other embodiments that depart from these specific details. In other instances, detailed descriptions of well-known methods, and techniques are omitted so as not to obscure the description of the present invention.

Figure 1:
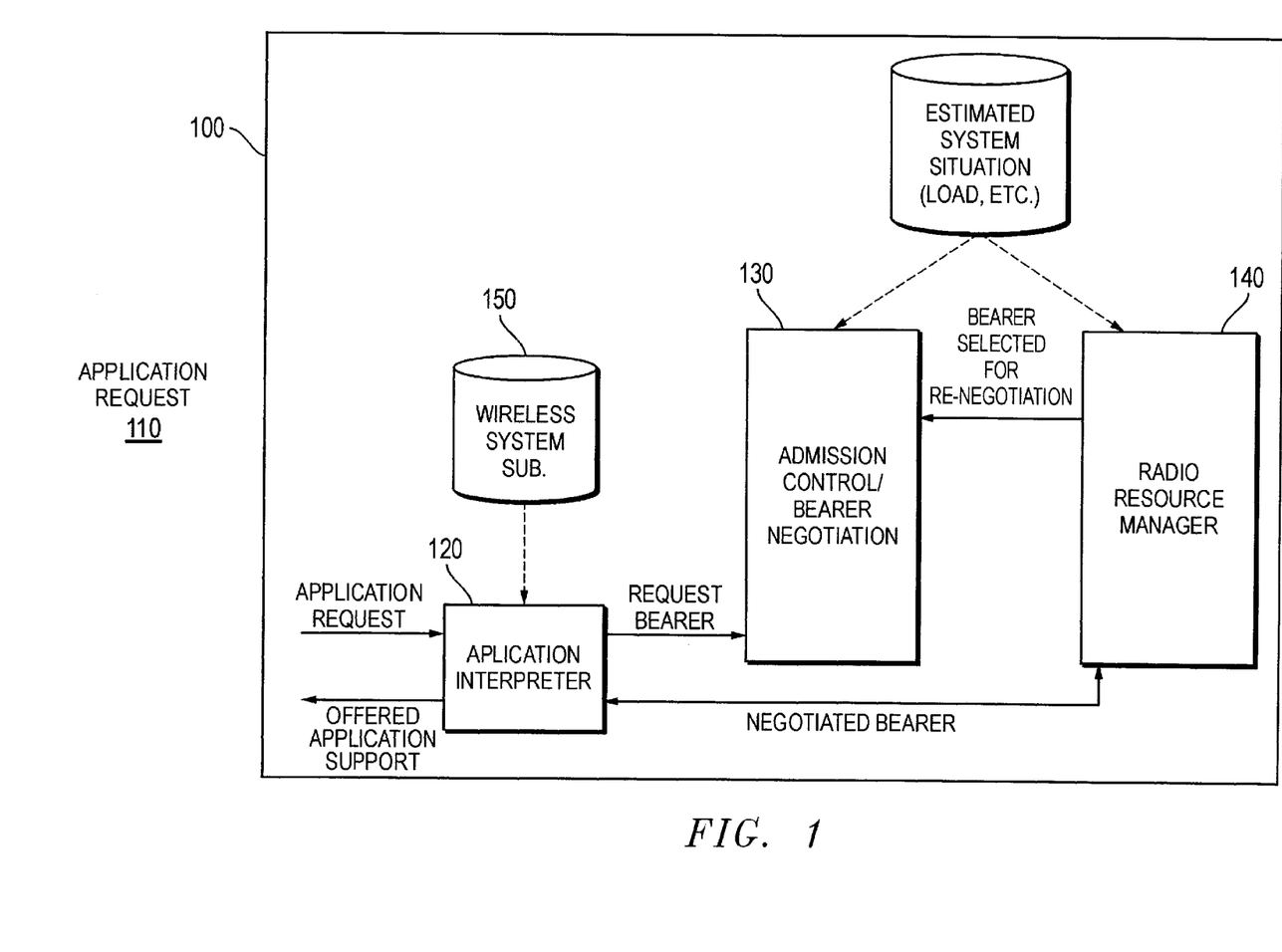
FIG. 1 illustrates a control system for handling multiple services in a telecommunications network.

According to exemplary embodiments of the present invention, an admission control function is disclosed that handles a mix of services in a wireless system. The admission control function is part of a structure which consists of a number of functional blocks. Referring to FIG. 1, a control system 100 for service handling is illustrated which comprises three functional blocks. These blocks are: an application interpreter (AI) 120, an admission control entity 130 and a radio resource manager (RRM) 140.

The application interpreter 120 is activated by a request 110 for a connection from an application. Based on this request, as well as on user-specific information and other information pertaining to the needs of the application, the application interpreter 120 generates a bearer request (or, requested service vector RSV). The user-specific information may be stored, for example, in a wireless subscription database 150. Information related to the needs of the application may be retrieved, for example, by monitoring the application setup signaling. This request (from the application) describes the characteristics of the desired bearer(s), i.e., the connection that is desired for carrying traffic through the wireless system. The types of information or attributes of the bearer include: (1) quality requirements for data transmitted such as delay, frame error ratio (FER) and bit error rate (BER); (2) source information such as how much data per unit time can be expected from the application; (3) general bearer and protocol information such as whether the bearer should be unidirectional or bi-directional, or whether erroneous frames should be forwarded to upper layers within the network; and (4) priority information that may be used to classify the importance of a bearer request and can thus be seen as the price the requesting entity is willing to pay for the bearer. When used in a bearer offer (OSV), priority should be interpreted as the cost of the offered bearer. The priority may be specified directly by the user through subscription.

An application request may result in more than one requested alternative bearer (RSV). The application interpreter 120 is also able to receive a negotiated bearer (or, negotiated service vector NSV) and translate the negotiated bearer (NSV) to a message that is understood by the application.

The radio resource manager 140 receives a negotiated bearer (NSV) for each active connection. The task of the radio resource manager is to achieve optimal utility of radio resources such as power and channels in order to maintain the specified bearer quality attributes that were identified or requested by the application. The algorithms involved in performing the functions of the radio resource manager 140 include, for example, handoff, power control, code allocation and selection of modulation, channel coding and spreading factor in a CDMA system. If all parameters of the negotiated bearer (NSV) cannot be maintained, the radio resource manager 140 may order re-negotiation of one or more bearers.

Figure 2:
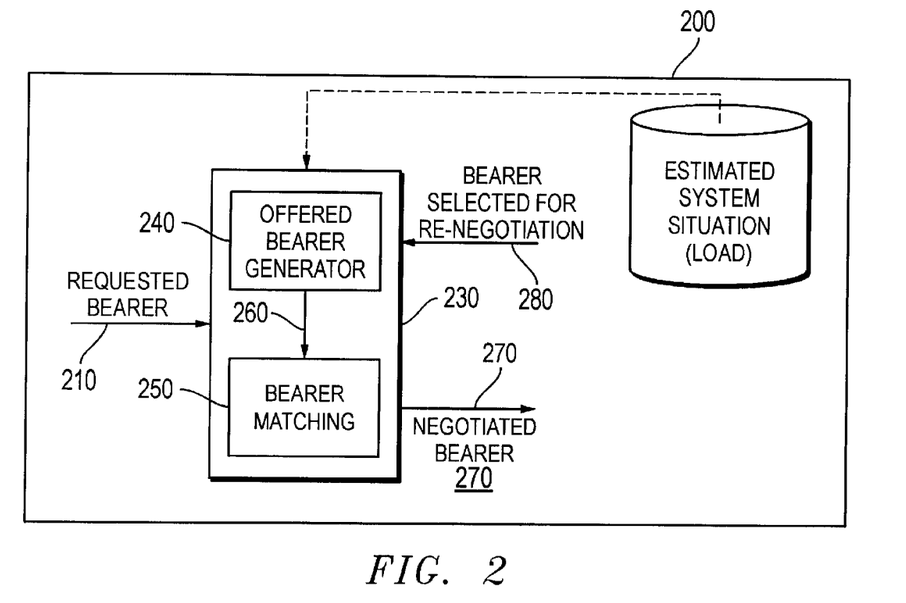
FIG. 2 illustrates an admission control function which is one part of the control system of FIG. 1.

The admission control entity 130 of FIG. 1 is illustrated as 230 in FIG. 2. According to exemplary embodiments of the present invention, the admission control function 230 comprises an offered bearer generator 240 and a bearer matching function 250. A bearer request 210 (RSV), generated based on an original request from an application, is received by the admission control 230. The bearer request may comprise more than one RSV or alternative RSVs. The alternative bearers can be described either by different discrete sets of attribute values, or one set of attributes where at least one attribute has a range of values. In response to this bearer request The offered bearer generator 240 generates bearers (OSV) 260 that can be offered, for example, to a requesting mobile station. This offered bearer 260 may include priority (or cost) of the bearers. The generation of the offered bearer (OSV) 260 is based on the requested source and quality bearer attributes as described above. In addition, the offered bearer 260 may be based on the present load and interference level in the cell in question as well as the cells interfering with this cell and on mobile station specific information such as the mobile station uplink and downlink signal quality. For example, in a highly loaded cell, the cost in terms of radio resources is lower if the quality of the requested bearer (RSV) is low. Similarly, the cost is lower to admit a mobile station having a good (i.e., long term) signal quality.

The bearer matching function 250 receives the requested bearer (RSV) 210 and offered bearers (OSV) 260 and attempts to match an offered bearer 260 with a requested bearer 210. During the matching process, a determination is made as to whether there exists an offered bearer (OSV) 260 that fulfills the terms and conditions (regarding quality, priority, etc.) specified in the requested bearers (RSV) 210. The priority portion of the bearer may be used for differentiation. That is, for example, if an offered bearer priority has been designated as high, the bearer can only be matched with important requests (i.e., those with high priority RSVs). The output of the matching step is a negotiated bearer (NSV) 270. If no match is found, the application request is denied; that is, the user with the bearer request (RSV) 210 is not admitted as no offered bearer (OSV) 260 has been generated by the offered bearer generator 240 that satisfies the bearer request 210.

As stated above, the offered bearer generator 240 and the bearer matching function 250 together may be seen as forming an admission control function 200, which receives a request for a connection and decides how to handle the request. However, instead of receiving a request and answering "yes" or "no" as in known admission control, the admission control function 200 of the present invention can receive a range of requests from the same application and select the most appropriate offered bearer for satisfying the requests. Multiple RSVs may be generated by the application where the value of at least one parameter may be different between the multiple RSVs. As an example, in $RSV_1$, the delay may be specified as 1 second and in $RSV_2$, it may be specified as 0.5 second. Alternatively, as a special form of a multiple request, one RSV may be generated where one or more parameters may have a range of values specified. As an example, within one RSV, the FER may be specified as one value, but, the delay may be specified as a range between two values such as from 0.5 second to 1 second. As another example, the bit rate may be specified with a range such as, for example, 32 to 64 kbps. This implies that any bit rate between these two values would be acceptable for the application. OSVs may also be generated in a similar manner. As described, the admission control function 200 is also able to handle different users and services differently.

Figure 3A:
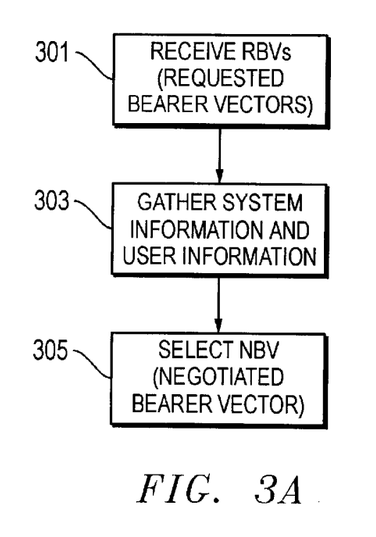
FIG. 3 illustrates bearer level definitions in accordance with the UMTS standard.
Figure 3B:
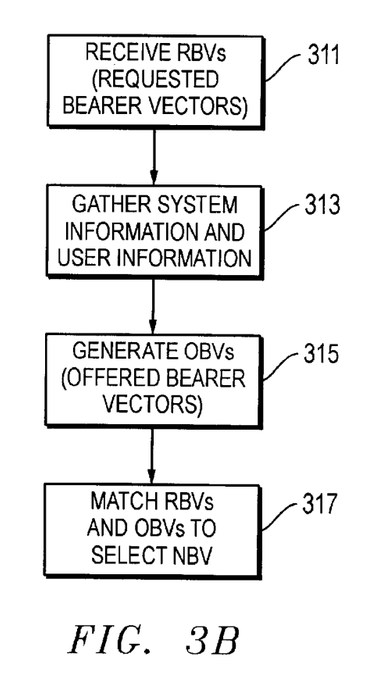

The offering of a service or bearer vector (OSV) and the negotiation of a service or bearer vector (NSV) may take place sequentially or simultaneously according to preferred embodiments of the present invention. According to a first embodiment, as illustrated by FIG. 3(a), the generation of an OSV and the negotiation to obtain a RSV may be performed in one joint admission control step 305. In a second embodiment, as illustrated in FIG. 3(b), the generation of an OSV takes place in step 315 and the negotiation to obtain a RSV takes place in step 317. According to the second embodiment, offering of multiple bearers (or, OSVs) at step 315, in response to one or more RSVs (in step 311) and after gathering of system information (in step 313), precedes the negotiation of NSV in step 317. These two steps, i.e., 315 and 317, are sequential.

One method utilized by known admission control for handling multiple requests is to perform a sequential operation. That is, initially a preferred bearer is requested and if that preferred bearer does not result in admission, another bearer is requested until admission is achieved. This solution, however, results in significant additional signaling. As a result, the decision made by the admission control is not as informed as if all alternatives are known simultaneously and prior to an admission control function being performed.

Figure 4:
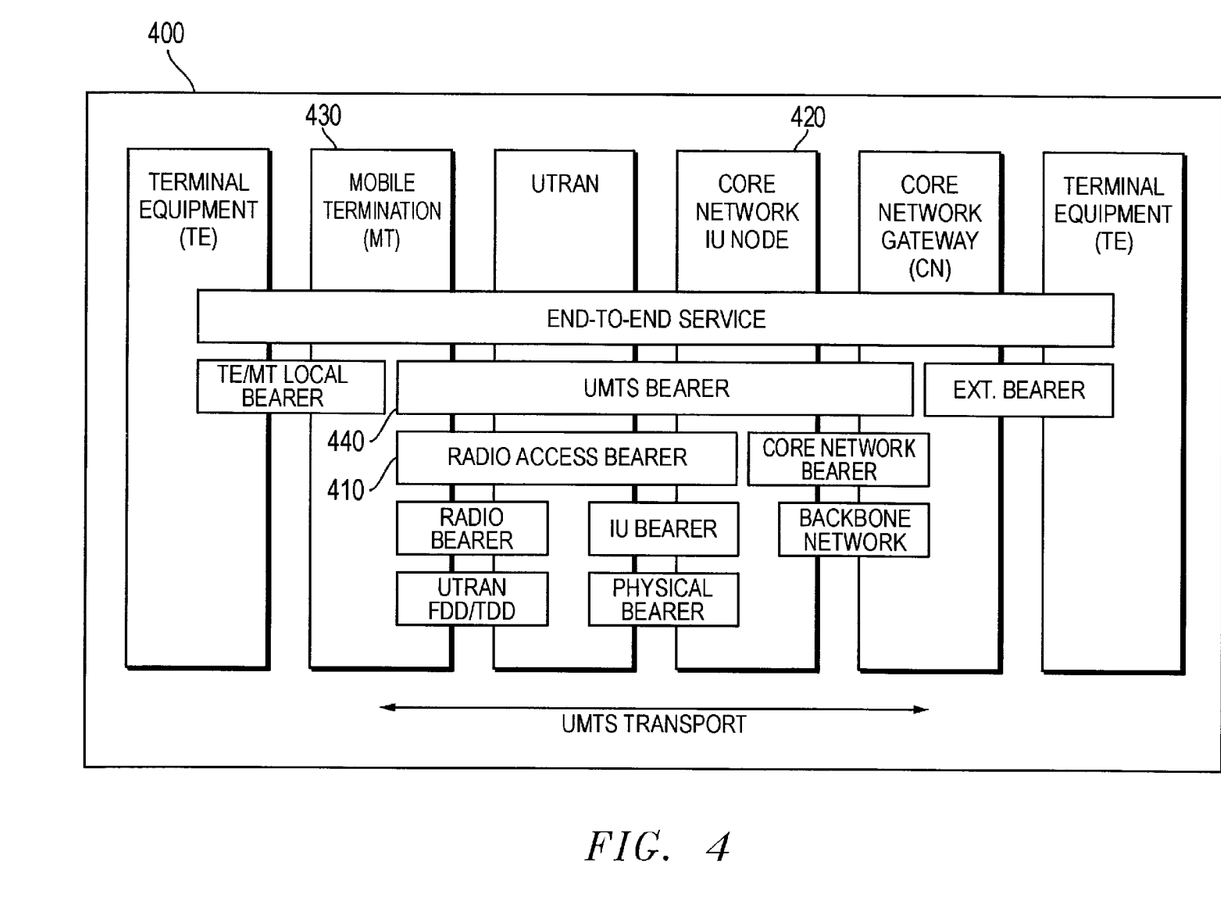
FIG. 4 illustrates a simplified view of bearer service request from terminal equipment.

If the quality of the negotiated bearer degrades to an unacceptable level, then a new bearer has to be renegotiated which is illustrated in FIG. 2 as 280. According to exemplary embodiments of the present invention, as illustrated in FIG. 4, a multi-mode application in an universal mobile telecommunications standard (UMTS) system is disclosed. In the UMTS system, a bearer structure 400 comprising several bearers each responsible for a different portion of the UMTS transmission are defined. In FIG. 4, a bearer service such as the UMTS bearer 440 is defined between the core network IU edge node (CN) 420 and the mobile termination node (MT) 430. A transmission between these two nodes forms a portion of the end-to-end transmission between the terminal equipment (TE) nodes of FIG. 4. A bearer service may be defined as a transport between two nodes with the service having certain QoS characteristics.

The characteristics are negotiated before commencement of transmission and therefore, are eventually part of the negotiated service vector, NSV. One bearer service that is defined is the radio access bearer (RAB) 410 which transports between a Core network IU edge node 420 and a mobile termination node (MT) 430. As seen in FIG. 4, the defined bearer services form a hierarchical structure, i.e., in order to set up a UMTS bearer service, a RAB service and a core network bearer service must be set up beneath the UMTS bearer service. The illustration of the RAB is for exemplary purposes only as negotiations may take place at all bearer levels.

A core network comprises a gateway and an IU edge node. In a GSM system, the corresponding nodes are GMSC and MSC. For a GPRS system, the corresponding nodes are GGSN and SGSN. The user equipment is logically divided into terminal equipment (TE) and mobile termination (MT). The TE portion includes higher protocol layers that are application specific while the MT portion includes lower protocol layers that are UMTS specific. As a result, the TE portion of the user equipment may not be knowledgeable about the UMTS and the MT portion may not be aware of what application is being used.

As described above, an application may operate in different quality modes. For example, a video codec may have a normal quality mode and a good quality. In the good mode, the application generates a higher data rate than in the normal mode. These may be represented as different quality modes having guaranteed bit rates of 64 kbps and 128 kbps. The perceived video quality is better with 128 kbps than with 64 kbps. This kind of video codec can belong to either of the two families of adaptive and elastic applications. An adaptive application requires that the mode of operation is signaled from the intermediate network to the application, whereas an elastic application can operate in any mode without being informed by the intermediate network of the mode to use. In this exemplary embodiment, an adaptive video codec is assumed.

Figure 5:
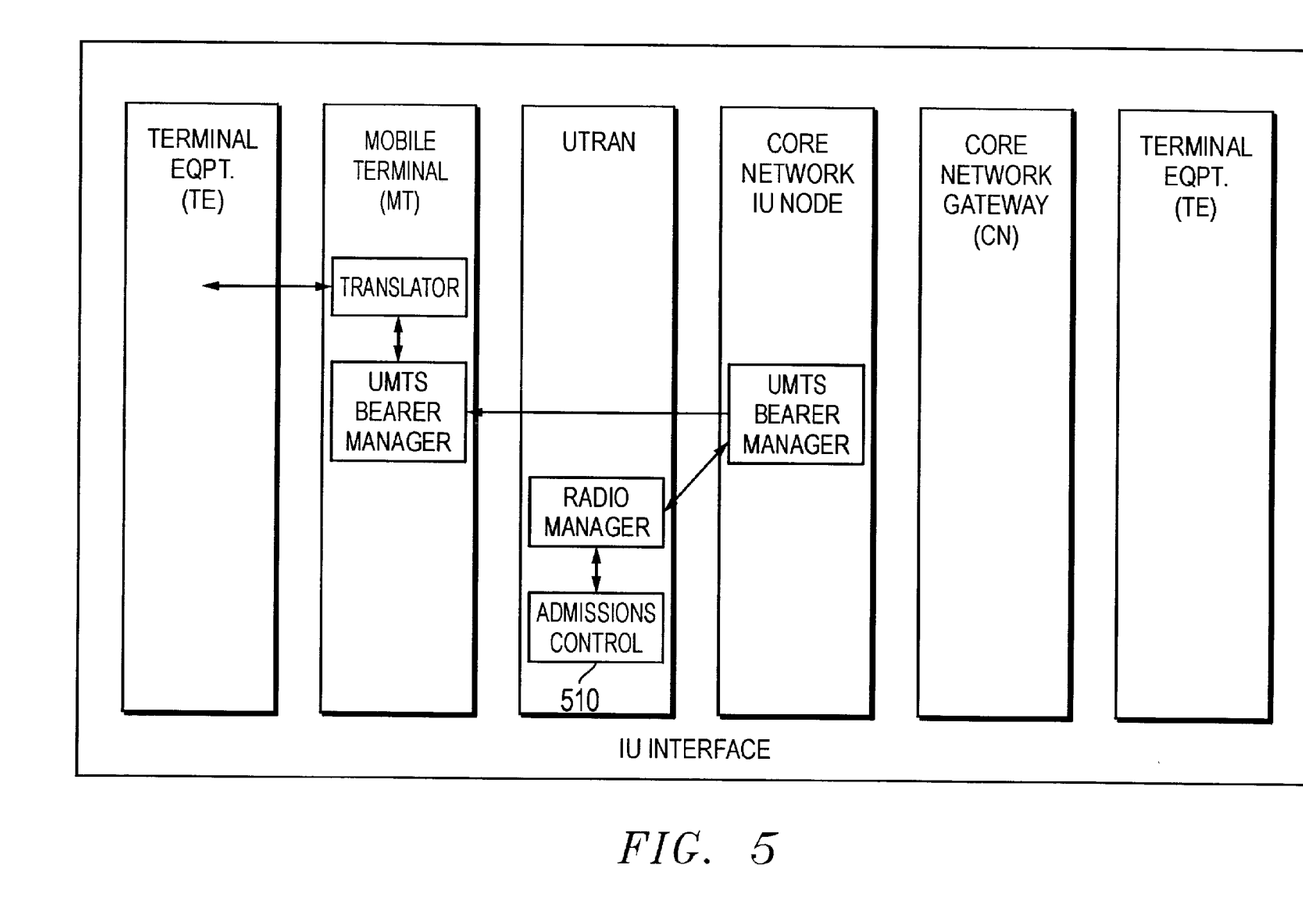
FIG. 5 illustrates a simplified view of a QoS request from an application.

The QoS request from the application will be signaled as illustrated in FIG. 5. In present systems, only one of the data rates can be requested at any one time. Thus, a data rate corresponding to, for example, 128 kbps, may be requested by the application. This request is translated into a UMTS bearer service request and eventually result in a RAB request which still comprises only one RAB with one data rate.

According to exemplary embodiments of the present invention, the application can provide a multiple alternative request comprising both data rates with reference to the video codec application. The resulting RAB request will also include two alternative RABs each with one guaranteed bitrate. The RAB request may also include other attributes, including a 'cost' the user is willing to pay for this RAB. The RAB request may be assigned an allocation/retention priority value. As an example, a priority value of 2 may be treated as being more important than a priority value of 3 but less important that a priority value of 1.

Upon receipt of this request, the admission control 510 (i.e., offered bearer generator 240 and bearer matching function 250 of FIG. 2) within the UTRAN considers the request and returns a negotiated RAB which includes the data rate.

In UMTS of a WCDMA system, the offered bearer generator may consider such input parameters as: uplink interference level in the active set of base stations (the active set may be denoted as 'a' which includes users 1 to n) to which the mobile station is connected, interference level in the cells interfered by the active set, signal quality in the connection between the mobile station and the active set of base stations, downlink transmit power in the active set, downlink transmit power in the cells interfered by the active set, downlink spreading codes used in the active set, queue sizes in UTRAn for other mobile stations connected to cell in the active set and memory, processing and buffer capacities of the nodes involved in the data transport (i.e., the MT, UTRAN and Core network Iu edge node). Based on these parameters, the offered bearer generator predicts the effects of an additional connection with data rates according to the request, and determines the 'cost' at which to offer the data rates. For instance, it may conclude that the interference level in the active set of base station is too high to offer the higher data rate to the mobile station. Therefore, the lower rate is more appropriate for this situation since the additional interference caused by this mobile station decreases with decreased data rate. The cost (expressed in terms of priority) is set very high for the high data rate service and lower for the low data rate service. The offered priority (i.e., the cost) reflects a level of importance assigned to a request of this bearer in order for the request to be admitted. If it is not possible to offer a certain bearer service due to resource limitation, the cost may be set to infinity and no connection will be possible in this scenario. In an unloaded system on the other hand, since the interference levels are low, both data rates (i.e., the 128 and 64 kbps) can be offered at a low cost.

In the particular example described above, the offered bearer generator considers the input parameters cited above and may conclude that:

i. the path loss between the mobile station and the active set is such that admitting the requesting user would increase the downlink power in the active set by $P_{1,64}-P_{n,64}$ and $P_{1,128}-P_{n,128}$ (P representing the power) and increase the uplink interference in the active set $I_{1,164}-I_{n,64}$ and $I_{1,128}-I_{n,128}$ (I representing interference) for bit rates of 64 kbps and 128 kbps, respectively;

ii. the current uplink interference in the active set is low enough to admit either of the bit rates which may increase the interference by $I_{1,64}-I_{n,64}$ and $I_{1,128}-I_{n,128}$ without risk of overloading;

iii. the current uplink interference in the cells interfered by the active set is low enough to admit either of the bit rates without risk of overloading;

iv. the downlink power in the active set is such that admitting a 64 kbps bit rate and increasing the power by $P_{1,64}-P_{n,64}$ would not cause an overload in the system, but admitting a 128 kbps bit rate and increasing the power by $P_{1,128}-P_{n,128}$ could potentially cause retention of another already admitted RAB;

vi. the downlink power in cells interfered by the active set is low enough to allow admission of either of the bit rates;

vii. there are enough free downlink spreading codes to allow admission of any of the two bit rates;

viii. queue sizes in the active set are small enough to allow admission of any of the two bit rates without causing excessive delay of other traffic;

ix. memory, processing and buffer capacities of the nodes involved in the data transport are available for supporting either of the two bit rates.

Thus, in the illustrated example, system and user situation is such that 64 kbps can be offered to a request of any priority without causing trouble to the system. An offered bearer with guaranteed bit rates of 64 kbps and allocation/retention priority of 3 (i.e., lowest possible priority) is formed. Bit rates of 128 kbps may also be offered but due to the downlink transmit power situation, it can only be offered to very important users. Therefore, an offered bearer is formed with guaranteed bit rates of 128 kbps and allocation/retention priority of 1.

Then, using requested and offered bearers as input, the bearer matching function generates a negotiated bearer to be used. In the example described above, the matching function will conclude, based on the priority values in request and offer, that the RAB with guaranteed bit rate of 64 kbps is the only possible selection for a negotiated bearer (NSV).

In another exemplary scenario, the downlink transmit power could allow admission of either bit rate with priority of 2 which would lead the matching function to select 128 kbps as the negotiated bearer. In yet another scenario, the downlink transmit power or any other common resource could be so scarce that admission of neither 64 kbps nor 128 kbps is allowed with priority 2. This would cause the matching function to return a request denial message instead of a negotiated bearer.

The negotiated bearer is translated back over the Iu interface and other interfaces to the application, informing the application as to the mode in which to operate. In the example highlighted above, the modes are good and normal. Other interfaces may include a radio interface. Since the application resides within the terminal equipment (TE), the TE must be informed of the outcome of the negotiation. Since the other TE must also be informed, the negotiation outcome must be signaled all the way from one TE to the other TE via the intermediate interfaces.

According to another exemplary embodiment of the present invention, an elastic application in UMTS is also disclosed. An application type is designated as being elastic if it can be carried by bearers of different quality without being explicitly informed about the mode of operation. An example of an elastic application is web browsing which can take place with a wide range of data rates. Hence, a network-dependent selection of bearer is still possible, but there is no need to explicitly inform the application as to which data rate is used.

Thus, the basic operation is the same as for the multi-mode application. However, there is only one application request coming to UMTS and it is the subscription within UMTS that specifies that this particular application request can be alternatively supported by, for example, two different radio access bearers having different rates or quality. Consequently, the bearer request over the Iu interface consists of two radio access bearers.

The offering and matching procedure is substantially the same except that the application need not be informed as to which bearer was selected, since it can only operate in one mode anyway.

With an adaptive application, the application has to know about potential re-negotiations that occur in the negotiated bearer (NSV) such as the bearer's inability to provide a particular delay, etc. These changes in the NSV have to be communicated or signaled back to the application so that the application may adapt to the changes in the NSV and changes its mode of operation.

In contrast, with an elastic application, no signaling back to the application is required. If one of the parameters of the NSV is re-negotiated, such as for example, delay, the application simply waits for the data. In this context, the application functions in a more tolerant manner, i.e., the application tolerates re-negotiations of the negotiated bearer and adjusts.

The invention provides an admission control system for structured handling of mixed services in a wireless system, which is necessary in future mixed services systems. It is applicable to existing systems such as GSM/GPRS, WCDMA (UMTS) and WLAN, as well as any other wireless system handling mixed services. The invention is not limited to wireless systems however.

The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being fully commensurate in scope with the following claims.

What is claimed is:

1. A telecommunication control system for handling data transfer quality for multiple adaptive and elastic applications, said system comprising:

an application interpreter that interfaces with the applications and generates at least one bearer request in response to a request from an application for a connection to a bearer, said bearer request including a requested level of data transfer quality, said application interpreter generating a new bearer request whenever a running adaptive or elastic application requests a connection requiring a different level of data transfer quality during an established data session;

an admission control apparatus that receives the at least one bearer request and matches each bearer request with an offered bearer to produce a negotiated bearer that meets the requested level of data transfer quality, said control apparatus producing a new negotiated bearer whenever the application interpreter generates a new bearer request that includes a different requested level of data transfer quality; and a radio resource manager that receives the negotiated bearer from the control apparatus, allocates radio network resources required to provide the requested level of data transfer quality, and whenever a new negotiated bearer is received, reallocates radio network resources in order to provide the level of data transfer quality specified in the new negotiated bearer.

2. The control system of claim 1, wherein the application interpreter generates the bearer request based on the request from an application and user specific information.

3. The control system of claim 1, wherein the bearer request comprises at least one of:
a plurality of requested quality of service attributes;
source information for the requesting application; and
priority information for the bearer request.

4. The control system of claim 3, wherein at least one of said plurality of quality of service attributes comprises a range of values.

5. The control system of claim 4, wherein said plurality of quality attributes comprises at least one of:
a delay;
a bit rate;
a frame erasure rate; and
a bit error rate.

6. The control system of claim 3, wherein said source information comprises a range of values.

7. The control system of claim 6, wherein the source information comprises a bit rate at which the requesting application handles data.

8. The control system of claim 1, wherein the requesting application is a video codec application.

9. The control system of claim 1, wherein the requesting application is a web browsing application.

10. In a telecommunication system handling data transfer, a method of providing requested levels of data transfer quality to multiple adaptive and elastic applications, said method comprising the steps of:

generating a bearer request by an application interface in response to a request from an application for a connection to a bearer, said bearer request including a requested level of data transfer quality;

generating at least one offered bearer by a bearer generator in response to the bearer request;

matching the bearer request with one of the offered bearers to produce a negotiated bearer that meets the requested level of data transfer quality;

allocating by a radio resource manager, radio network resources required to provide the requested level of data transfer quality;

generating by the application interpreter, a new bearer request whenever a running adaptive or elastic application requests a connection requiring a different level of data transfer quality during an established data session;

responsive to the new bearer request, producing a new negotiated bearer by the bearer generator, said new negotiated bearer meeting the requested level of data transfer quality in the new bearer request; and responsive to the new negotiated bearer, reallocating radio network resources by the radio resource manager in order to provide the level of data transfer quality specified in the new negotiated bearer.

11. The method of claim 10, wherein the step of generating at least one offered bearer includes evaluating by the bearer generator, a plurality of input parameters, said input parameters including an interference level in an active set of base stations currently serving a mobile station.

12. The method of claim 11, wherein said plurality of input parameters further comprises a signal quality of a connection between said mobile station and said active set of base stations.

13. The method of claim 11, wherein said plurality of input parameters further comprises attributes relating to memory, processing, and buffer capacities of a plurality of nodes involved in data transport.

14. The admission control method of claim 10, wherein the step of generating a bearer request includes generating a request that Includes at least one of:

a plurality of requested quality of service attributes;

source information for the requesting application; and priority information for the bearer request.

15. In a telecommunication system handling data transfer, a method of providing and maintaining requested levels of data transfer quality to multiple adaptive and elastic applications, said method comprising the steps of:

(a) generating a bearer request by an application interface in response to a request from an application for a connection to a bearer, said bearer request including a requested level of data transfer quality;

(b) generating at least one offered bearer by a bearer generator in response to the bearer request;

(c) matching the bearer request with one of the offered bearers to produce a negotiated bearer that meets the requested level of data transfer quality;

(d) allocating by a radio resource manager, radio network resources required to provide the requested level of data transfer quality;

(e) whenever an application requests a new level of data transfer quality during an established data session, repeating steps (a) through (d) to provide the new level of data transfer quality;

(f) monitoring the radio network resources by the radio resource manager to detect any deterioration of the resources that may cause the provided level of data transfer quality to fall below the requested level; and (g) responsive to detecting a deterioration of the resources that may cause the provided level of data transfer quality to fall below the requested level, automatically reallocating by the radio resource manager, radio network resources to the negotiated bearer, in order to maintain the requested level of data transfer quality.

* * * * *